United States Patent
Mamada et al.

(10) Patent No.: US 9,283,946 B2
(45) Date of Patent: Mar. 15, 2016

(54) VEHICLE DRIVE APPARATUS

(75) Inventors: Takaaki Mamada, Susono (JP); Takuya Okada, Toyota (JP); Toshiya Yamashita, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 12 days.

(21) Appl. No.: 14/349,804

(22) PCT Filed: Oct. 6, 2011

(86) PCT No.: PCT/JP2011/073142
§ 371 (c)(1),
(2), (4) Date: Apr. 4, 2014

(87) PCT Pub. No.: WO2013/051144
PCT Pub. Date: Apr. 11, 2013

(65) Prior Publication Data
US 2014/0243151 A1 Aug. 28, 2014

(51) Int. Cl.
| | |
|---|---|
| *F16H 45/02* | (2006.01) |
| *B60W 10/06* | (2006.01) |
| *B60W 10/02* | (2006.01) |
| *F16H 61/14* | (2006.01) |

(52) U.S. Cl.
CPC ............. *B60W 10/02* (2013.01); *B60W 10/06* (2013.01); *F16H 61/143* (2013.01); *B60W 2510/02* (2013.01); *F16H 2045/0205* (2013.01); *F16H 2045/0252* (2013.01); *F16H 2045/0294* (2013.01); *F16H 2061/145* (2013.01); *Y10T 477/753* (2015.01)

(58) Field of Classification Search
None
See application file for complete search history.

(56) References Cited

U.S. PATENT DOCUMENTS

| | | | |
|---|---|---|---|
| 4,974,710 A | 12/1990 | Murasugi | |
| 5,277,287 A | 1/1994 | Ishii et al. | |
| 2001/0052443 A1* | 12/2001 | Tomiyama et al. | 192/3.29 |
| 2005/0210971 A1* | 9/2005 | Satoh | F16D 48/06 73/114.04 |
| 2009/0247363 A1 | 10/2009 | Nagami et al. | |
| 2009/0305847 A1* | 12/2009 | Klump et al. | 477/86 |
| 2011/0192691 A1 | 8/2011 | Murata et al. | |
| 2011/0195795 A1 | 8/2011 | Murata et al. | |

FOREIGN PATENT DOCUMENTS

| | | |
|---|---|---|
| JP | 01-220765 | 9/1989 |
| JP | 04-224362 B2 | 8/1992 |
| JP | 08-121591 A | 5/1996 |
| JP | 2009-243639 A | 10/2009 |
| JP | 2010-084852 A | 4/2010 |
| JP | 2010-091099 A | 4/2010 |
| JP | 2011-208774 A | 10/2011 |

* cited by examiner

Primary Examiner — Ramya Burgess
Assistant Examiner — Mark Manley
(74) Attorney, Agent, or Firm — Kenyon & Kenyon LLP

(57) ABSTRACT

A vehicle drive device includes: an engine; a fluid power transmission device; a clutch disposed between an input side member and an output side member in the fluid power transmission device; and a torsional vibration reduction device disposed in a power transmission path between the engine and the fluid power transmission device in series with the fluid power transmission device, wherein when the clutch is put into slip engagement, the vehicle drive device has a minimum value set equal to or greater than zero for a differential rotation speed acquired by subtracting a rotation speed of the output side member from a rotation speed of the input side member and has a minimum value set less than zero for a differential rotation speed acquired by subtracting the rotation speed of the output side member from a rotation speed of an input side inertial body in the torsional vibration reduction device.

5 Claims, 9 Drawing Sheets

| $\theta_{TH}$ | $N_E$ | | | |
|---|---|---|---|---|
| | $N_1$ | $N_2$ | $N_3$ | ... |
| $\theta_1$ | $A_{11}$ | $A_{12}$ | $A_{13}$ | ... |
| $\theta_2$ | $A_{21}$ | $A_{22}$ | $A_{23}$ | ... |
| $\theta_3$ | $A_{31}$ | $A_{32}$ | $A_{33}$ | ... |
| ... | ... | ... | ... | ... |

FIG.10

| $\theta_{TH}$ | $N_E$ | | | |
|---|---|---|---|---|
| | $N_1$ | $N_2$ | $N_3$ | ... |
| $\theta_1$ | $B_{11}$ | $B_{12}$ | $B_{13}$ | ... |
| $\theta_2$ | $B_{21}$ | $B_{22}$ | $B_{23}$ | ... |
| $\theta_3$ | $B_{31}$ | $B_{32}$ | $B_{33}$ | ... |
| ... | ... | ... | ... | ... |

--PRIOR ART--

FIG.16

--PRIOR ART--

FIG.17

--PRIOR ART--

VEHICLE DRIVE APPARATUS

CROSS-REFERENCE TO RELATED APPLICATIONS

This is a national phase application based on the PCT International Patent Application No. PCT/JP2011/073142 filed on Oct. 6, 2011, the entire contents of which are incorporated herein by reference.

TECHNICAL FIELD

The present invention relates to a vehicle drive device including a fluid power transmission device having a clutch and particularly to an improvement for realizing preferred fuel efficiency while allowing a torsional vibration reduction device to produce a vibration suppressing effect during slip control of the clutch.

BACKGROUND ART

A vehicle is known that includes an engine, a fluid power transmission device, and a clutch disposed between an input side member and an output side member of the fluid power transmission device. For example, this corresponds to a vehicle including a torque converter with a lockup clutch in a power transmission path between an engine and a transmission. In such a vehicle, a technique is known that provides slip control of putting the lockup clutch into slip-engagement (partial engagement) if a predetermined condition is satisfied. For example, this corresponds to a controller of a clutch described in Patent Document 1. It is described that this technique provides the slip control of a lockup clutch to set differential rotation between an input rotation member and an output rotation member of the torque converter to a target value, thereby enabling a responsive slip control with stability ensured even when the engine is in a high-rotation high-torque state.

PRIOR ART DOCUMENTS

Patent Documents

Patent Document 1: Japanese Laid-Open Patent Publication No. 2009-243639
Patent Document 2: Japanese Laid-Open Patent Publication No. 04-224362
Patent Document 3: Japanese Laid-Open Patent Publication No. 01-220765

SUMMARY OF THE INVENTION

Problem to be Solved by the Invention

A vehicle drive device includes, for example, a constituent element such as a torsional dumper as a torsional vibration reduction device for reducing torsional vibration generated by an engine, for example. If such a torsional vibration reduction device is disposed on a vehicle including a torque converter with a lockup clutch in a power transmission path between an engine and a transmission in a conventional technique, the torsional vibration reduction device is typically disposed in series with the lockup clutch, i.e., in parallel with the torque converter.

However, considering that the slip control of the lockup clutch is provided in such a conventional configuration in accordance with, for example, the conventional technique as described above, a vibration reduction effect from the torsional vibration reduction device disadvantageously decreases if an engine with relatively large torque variation is included. In particular, since vibration input to the torsional vibration reduction device is mostly interrupted by the lockup clutch, the vibration is not transmitted to the torsional vibration reduction device and the vibration may not substantially be absorbed. Therefore, since the vibration generated by the engine is transmitted to a vehicle body and gives discomfort, the slip control of the lockup clutch cannot sufficiently be provided and an improvement in fuel efficiency is disadvantageously inhibited. Such a problem was newly found out by the present inventors in the course of intensive study with the intention of improvement in drivability and improvement in fuel efficiency in a vehicle drive device including a fluid power transmission device having a clutch.

The present invention was conceived in view of the situations and it is therefore an object of the present invention to provide a vehicle drive device realizing preferred fuel efficiency while allowing a torsional vibration reduction device to produce a vibration suppressing effect during slip control of a clutch included in a fluid power transmission device.

Means for Solving the Problem

To achieve the object, the first aspect of the invention provides a vehicle drive device comprising: an engine; a fluid power transmission device; a clutch disposed between an input side member and an output side member in the fluid power transmission device; and a torsional vibration reduction device disposed in a power transmission path between the engine and the fluid power transmission device in series with the fluid power transmission device, wherein when the clutch is put into slip engagement, the vehicle drive device has a minimum value set equal to or greater than zero for a differential rotation speed acquired by subtracting the rotation speed of the output side member from a rotation speed of the input side member and has a minimum value set less than zero for a differential rotation speed acquired by subtracting a rotation speed of the output side member from a rotation speed of an input side inertial body in the torsional vibration reduction device.

Effects of the Invention

As described above, according to the first aspect of the invention, when the clutch is put into slip engagement, the vehicle drive device has a minimum value set equal to or greater than zero for a differential rotation speed acquired by subtracting a rotation speed of the output side member from a rotation speed of the input side member and has a minimum value set less than zero for a differential rotation speed acquired by subtracting the rotation speed of the output side member from a rotation speed of an input side inertial body in the torsional vibration reduction device and, therefore, the torsional vibration input to the clutch can be reduced by the torsional vibration reduction device while a durability of the friction material in the clutch is improved, and the slip control by the clutch and the vibration suppression by the torsional vibration reduction device can be achieved at the same time. In other words, the vehicle drive device can be provided that realizes preferred fuel efficiency while allowing the torsional vibration reduction device to produce the vibration suppressing effect, during the slip control of the clutch included in the fluid power transmission device.

The second aspect of the invention dependent on the first aspect of the invention provides a vehicle drive device, wherein a target value of the differential rotation speed acquired by subtracting the rotation speed of the output side member from the rotation speed of the input side member is set to a value smaller than vibration of the rotation speed of the input side inertial body in the torsional vibration reduction device and larger than vibration of a rotation speed input to the clutch. Consequently, the torsional vibration input to the clutch can be reduced by the torsional vibration reduction device while the durability of the friction material is improved in the clutch, and the slip control by the clutch and the vibration suppression by the torsional vibration reduction device can be achieved at the same time in a practical form.

The third aspect of the invention dependent on the first or second aspect of the invention provides a vehicle drive device, wherein differential rotation between the input side member and the output side member is set equal to or less than 1/2 rotations per second. Consequently, particularly when the friction coefficient of the friction material of the clutch easily changes depending on the differential rotation between the input side member and the output side member, preferred fuel efficiency can be realized while the vibration suppressing effect is produced by the torsional vibration reduction device.

The fourth aspect of the invention dependent on any one of the first to third aspects of the invention provides a vehicle drive device, wherein a value acquired by dividing torsional rigidity of the torsional vibration reduction device by total inertial mass in a power transmission path from the engine to the clutch is set less than 5000. Consequently, the vibration can preferably be reduced as compared to the conventional configuration without the torsional vibration reduction device in the power transmission path between the engine and the fluid power transmission device.

MODE FOR CARRYING OUT THE INVENTION

Although the fluid power transmission device is preferably a torque converter including constituent elements such as a pump impeller acting as an input side member, a turbine impeller acting as an output side member, and a stator impeller disposed therebetween, the present invention produces a certain degree of effect even in a vehicle drive device including a fluid coupling without a torque amplification function as the fluid power transmission device.

Although the torsional vibration reduction device is preferably a damper mechanism (torsional damper) having two types of damper springs, for example, a large-diameter damper spring and a small-diameter damper spring to reduce torsional vibration with buffering action thereof, the torsional vibration reduction device may be a damper mechanism having another structure or mode, such as those having one or three types of damper springs and those having damper springs different in size or position. The present invention produces a certain degree of effect even in a vehicle drive device including an elastic member made of rubber etc., as an element of the torsional vibration reduction device.

Although the control is preferably applied during steady running of a vehicle to set a minimum value of differential rotation speed equal to or greater than zero between the input side member and the output side member and to set the minimum value of differential rotation speed less than zero between an input side inertial body in the torsional vibration reduction device and the output side member when the clutch is put into the slip engagement, this control may be provided during relatively gradual transient running.

A preferred embodiment of the present invention will now be described in detail with reference to the drawings.

Embodiment

Figure 1:
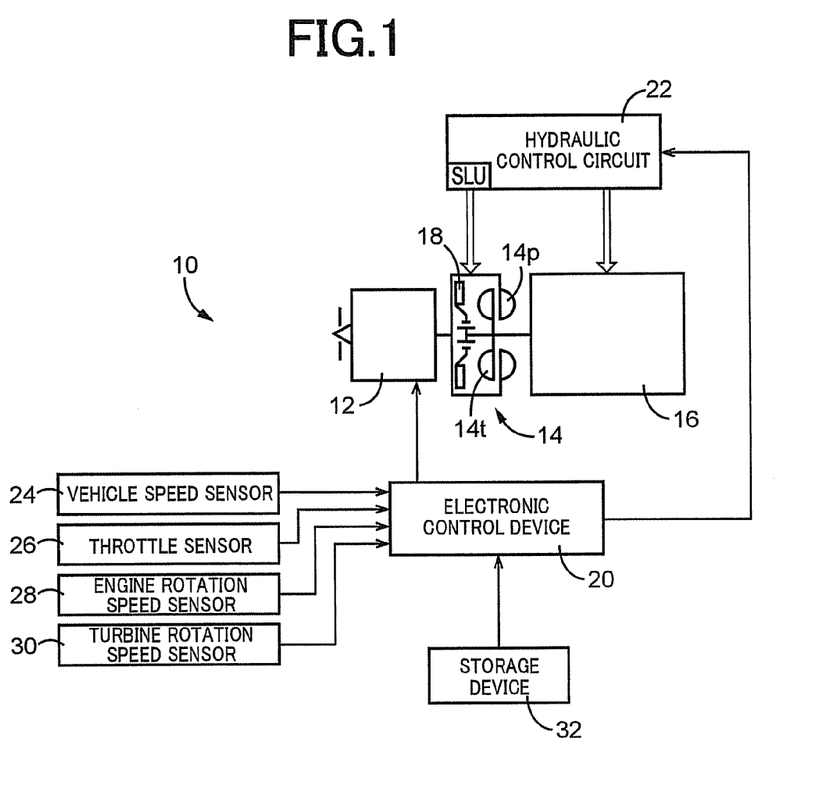
FIG. 1 is a diagram for explaining a vehicle drive device to which the present invention is preferably applied and a control system thereof.
Figure 2:
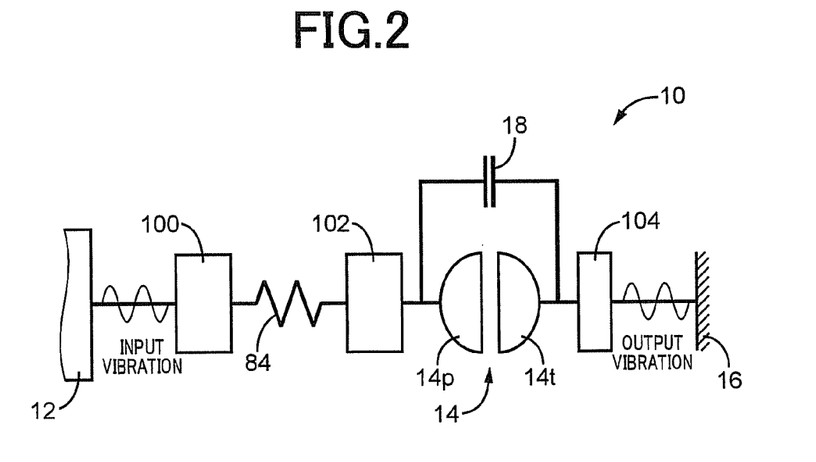
FIG. 2 is a schematic generally depicting a power transmission path in the vehicle drive device of FIG. 1.

FIG. 1 is a diagram for explaining a vehicle drive device 10 to which the present invention is preferably applied and a control system thereof. FIG. 2 is a schematic generally depicting a power transmission path in the vehicle drive device 10. As depicted in FIG. 1, the vehicle drive device 10 (hereinafter simply referred to as a drive device 10) of this embodiment includes an engine 12 acting as a drive force source (main power source) for running, a torque converter 14 acting as a fluid power transmission device, and an automatic transmission 16 in series and is disposed between the engine 12 and a pair of drive wheels not depicted to transmit power output from the engine 12 sequentially via differential gear devices etc., not depicted to the pair of the drive wheels.

The engine 12 is an internal combustion engine such as a gasoline engine or a diesel engine generating a drive force through combustion of fuel injected into a cylinder, for example. The torque converter 14 is a fluid power transmission device including a pump impeller 14p coupled to a crankshaft of the engine 12, a turbine impeller 14t coupled to the automatic transmission 16 via a turbine shaft corresponding to an output side member, and a stator impeller 14t disposed between the pump impeller 14p and the turbine impeller 14t (see FIG. 3 described later) so as to transmit power via fluid. Between the pump impeller 14p and the turbine impeller 14t, a lockup clutch 18 (hereinafter simpler referred to as a clutch 18) is disposed that is an engagement element (direct clutch) configured to integrally rotate the pump impeller 14p and the turbine impeller 14t when engaged. The clutch 18 is configured such that an engagement state is controlled to a release, a slip engagement (partial engagement), or a complete engagement by a hydraulic control circuit 22 described later. The automatic transmission 16 is a stepped automatic transmission mechanism having any of predefined multiple shift stages (gear ratios) selectively established, for example, and includes a plurality of hydraulic friction engagement devices as engagement elements for making the shift.

As depicted in FIG. 1, the drive device 10 includes an electronic control device 20 for providing various controls related to the drive device 10, such as output control of the engine 12, automatic shift control of the automatic transmission 16, and engagement control of the clutch 18. The electronic control device 20 includes a so-called microcomputer including a CPU, a RAM, a ROM, and an input/output interface, for example, and the CPU executes signal processes in accordance with programs stored in advance in the ROM, while utilizing a temporary storage function of the RAM, to provide the output control of the engine 12, the automatic shift control of the automatic transmission 16, the engagement/release control of the clutch 18, etc. The electronic control device 20 is configured to be divided into a plurality of control devices such that respective individual control devices are included for the control of the engine 12, the control of the automatic transmission 16, and the control of the clutch 18 as needed.

As depicted in FIG. 1, the electronic control device 20 is supplied with signals from various sensors disposed on portions of the vehicle to indicate a state of the vehicle. In particular, the electronic control device 20 is supplied with a vehicle speed signal indicative of a vehicle speed V corresponding to an output rotation speed of the automatic transmission 16 detected by a vehicle speed sensor 24, a throttle opening degree signal indicative of an opening degree $\theta_{TH}$ of an electronic throttle valve not depicted detected by a throttle sensor 26, an engine rotation speed signal indicative of a rotation speed $N_E$ of the engine 12 detected by an engine rotation speed sensor 28, a turbine rotation speed signal indicative of an input rotation speed of the automatic transmission 16, i.e., a rotation speed $N_T$ of the turbine impeller 14t, detected by a turbine rotation speed sensor 30, etc.

The electronic control device 20 outputs signals for controlling operations in portions of the vehicle. In particular, the electronic control device 20 outputs, as an engine output control command signal $S_E$ for the output control of the engine 12, for example, a throttle signal for driving a throttle actuator for controlling opening and closing of an electronic throttle valve not depicted, an injection signal for controlling an amount of fuel injected from a fuel injection device, and an ignition timing signal for controlling a timing of ignition of the engine 12 by an ignition device. For providing the shift control of the automatic transmission 16, a control signal is output for controlling the drive of a hydraulic actuator included in the automatic transmission 16 via the hydraulic control circuit 22. For controlling the engagement state of the clutch 18, a control signal is output for controlling an oil pressure supplied to the torque converter 14 via a linear solenoid valve SLU for lockup control included in the hydraulic control circuit 22.

Figure 3:
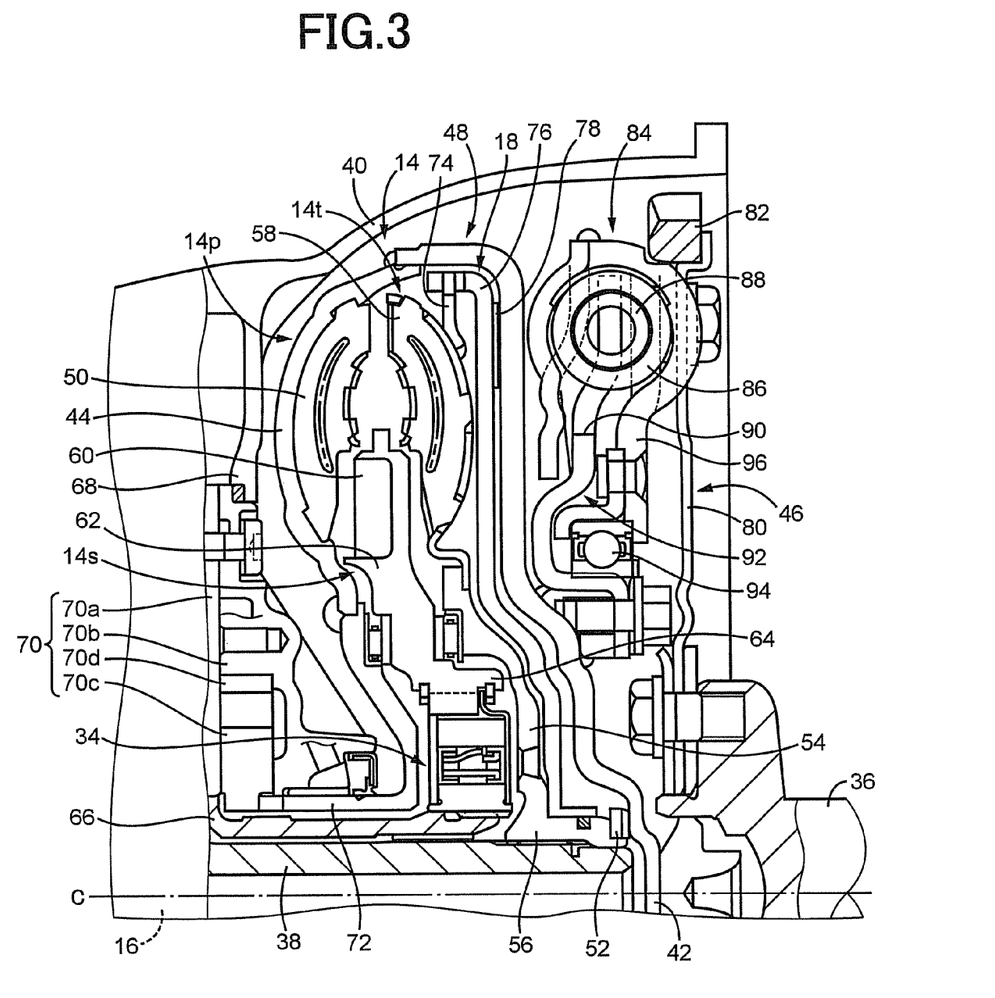
FIG. 3 is a cross-sectional view taken along a plane including an axial center for explaining a configuration of the torque converter included in the vehicle drive device of FIG. 1 in detail.

FIG. 3 is a cross-sectional view taken along a plane including an axial center C for explaining a configuration of the torque converter 14 included in the drive device 10 in detail. As depicted in FIG. 3, the torque converter 14 disposed in a cylindrical housing 40 acting as a non-rotating member includes the pump impeller (pump impeller) 14p, the turbine impeller (turbine runner) 14t, the stator impeller 14s, the clutch 18, and a unidirectional clutch (one-way clutch) 34 disposed between the stator impeller 14s and the housing 40 as described with reference to FIG. 1 and amplifies a torque input from a crankshaft 36 of the engine 12 acting as the drive force source to output the torque from an input shaft 38 of the automatic transmission 16 functioning as an output shaft of the torque converter 14.

The pump impeller 14p includes a pump cover 48 consisting of a disk-shaped front cover 42 and a rear cover 44 and coupled via a drive plate 46 and a damper mechanism 84 described later to the crankshaft 36 of the engine 12 to be rotated around the axial center C at the same rotation number as the crankshaft 36, and a plurality of blades 50 arranged in a circumferentially overlapping manner inside an outer circumferential portion of the rear cover 44. The turbine impeller 14t includes a disk-shaped hub portion 54 spline-fitted to a shaft end portion of the input shaft 38 and allowed to relatively rotatably abut on the front cover 42 via a sliding ring 52, a cylindrical shaft portion 56 projected from the center of the hub portion 54 and spline-fitted to the shaft end portion of the input shaft 38, and a plurality of blades 58 fixed to face the blades 50 of the pump impeller 14p in a circumferentially overlapping manner on an outer circumferential portion of the hub portion 54 such that the turbine impeller 14t rotates around the axial center C along with the input shaft 38. The stator impeller 14s includes a circular plate portion 62 having an outer circumferential portion with a blade 60 formed to be located between the blades 50 of the pump impeller 14p and the blades 58 of the turbine impeller 14t, and a cylindrical portion 64 formed on an inner circumferential portion of the circular plate portion 62 with the unidirectional clutch 34 fitted therein, and is supported rotatably around the axial center C via the unidirectional clutch 34 by a cylindrical fixation shaft 66 that is a non-rotating member fixed to the housing 40.

The housing 40 is disposed with a partition wall 68 for separating a space housing the automatic transmission 16 and a space housing the torque converter 14 therein and the partition wall 68 is disposed with a hydraulic pump 70. The hydraulic pump 70 includes a pump body 70a fixed to the partition wall 68, a pump cover 70b fixed to the pump body 70a, and inner and outer ring gears 70c and 70d rotatably housed in a space formed therebetween and meshed with each other, and the inner ring gear 70c is relatively non-rotatably fit to a shaft end of a cylindrical shaft 72 projected from an inner circumferential portion of the rear cover 44 of the pump impeller 14p so that the hydraulic pump 70 is rotationally driven by the engine 12. The hydraulic pump 70, i.e., the pump body 70*a* protrudes into a cone shape from the partition wall 68 toward the torque converter 14, i.e., toward the engine 12 or input side. The input shaft 38 is rotatably supported by the partition wall 68 via a bearing not depicted and is protruded into the space housing the torque converter 14 so as to support the torque converter 14

The clutch 18 includes a circular plate-shaped piston 76 that has a center portion slidably fitted to an outer circumferential surface of the cylindrical shaft portion 56 projected from the center of the hub portion 54 of the turbine impeller 14*t* relatively non-rotatably fitted to the shaft end portion of the input shaft 38 and that is relatively non-rotatably engaged with an engagement projection 74 projected from the blade 58 of the turbine impeller 14*t*, and an annular friction material 78 that is fixedly attached to an outer circumferential portion of the piston 76 or a portion of the inside of the front cover 42 opposed to the outer circumferential portion and that directly couples the turbine impeller 14*t* and the pump impeller 14*p* to each other through a frictional force. The drive plate 46 fixed to a shaft end of the crankshaft 36 of the engine 12 includes a circular plate-shaped portion 80 and a ring gear 82 fixed to an outer circumferential portion of the circular plate-shaped portion 80 for meshing with a pinion of a starter motor not depicted.

The damper mechanism 84 is disposed between the drive plate 46 and the front cover 42 making up a front portion of the pump cover 48. The damper mechanism 84 includes a circular plate-shaped damper hub 92 that is fixed at an inner circumferential portion to the front cover 42 and that has cutouts 90 formed at a plurality of positions of an outer circumferential portion at equal intervals and opened outward in the radial direction for accepting two types of large-diameter and small-diameter damper springs 86 and 88 wound into a coil shape longitudinally along a circumferential direction of the damper mechanism 84 in a concentric configuration, and a damper cover 96 that is rotatably supported around the axial center C via a bearing 94 by the front cover 42 and fixed to the circular plate-shaped portion 80 of the drive plate 46 and that has circumferentially extended column-shaped spaces formed at a plurality of circumferential positions at equal intervals for covering and accepting an outer circumference of a pair of the large-diameter and small-diameter damper springs 86 and 88.

As depicted in FIG. 3, the damper mechanism 84 is disposed in a power transmission path between the engine 12 and the torque converter 14 that is a fluid power transmission device (a power transmission path between the engine 12 and the automatic transmission 16) in series with the torque converter 14. In the damper mechanism 84 configured as described above, the large-diameter damper spring 86 and the small-diameter damper spring 88 are compressed circumferentially, i.e., in a longitudinal direction thereof, depending on a gap in rotation phase between the damper hub 92 and the damper cover 96 so as to absorb (reduce) torque variation in a rotational direction of the crankshaft 36 transmitted from the engine 12. Therefore, in this embodiment, the damper mechanism 84 corresponds to a torsional vibration reduction device (torsional damper) disposed in the power transmission path between the engine 12 and the torque converter 14 to reduce the torque variation (torsional vibration) in the path.

Describing power transmission in the drive device 10 with reference to FIG. 2, a torque generated by the engine 12 is input via a first inertial body 100 between the engine 12 and the damper mechanism 84 to the damper mechanism 84 and is further transmitted to a second inertial body 102 between the damper mechanism 84 and the torque converter 14. The torque transmitted to the second inertial body 102 is transmitted via the torque converter 14 (the pump impeller 14*p* and the turbine impeller 14*t*) to a third inertial body 104 between the torque converter 14 and the automatic transmission 16 and is then input to the automatic transmission 16. Through a power transmission path including the clutch 18 disposed in parallel with the power transmission path, the torque transmitted to the second inertial body 102 is transmitted via the clutch 18 to the third inertial body 104 and is then input to the automatic transmission 16. The first inertial body 100, the second inertial body 102, and the third inertial body 104 are conceptual constituent elements when members making up the drive device 10 are considered as inertia bodies, and the first inertial body 100 on an upstream side of the damper mechanism 84 corresponds to an input side inertial body in the damper mechanism 84.

Figure 4:
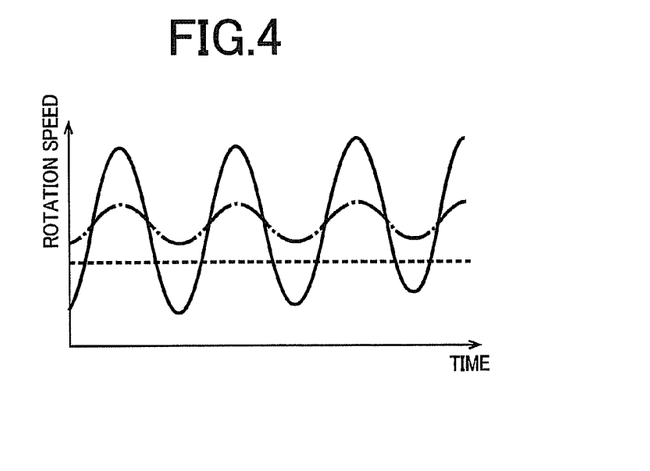
FIG. 4 is a diagram for explaining vibration related to power transmission in the vehicle drive device of FIG. 1.

FIG. 4 is a diagram for explaining vibration related to power transmission in the drive device 10 and depicts input vibration (input rotation), i.e., vibration (rotation) input to the first inertial body 100, as a solid line, pre-clutch vibration (pre-clutch rotation), i.e., vibration (rotation) input to the second inertial body 102, as a dashed-dotted line, and output rotation, i.e., rotation output from the third inertial body 104, as a broken line. Although vibration (torsional vibration) generated by the engine 12 is input via the first inertial body 100 and the second inertial body 102 to the torque converter 14, since the damper mechanism 84 is disposed between the first inertial body 100 and the second inertial body 102 in the configuration of this embodiment, the torsional vibration is reduced by the damper mechanism 84 and the vibration input to the second inertial body 102 indicated by the dashed-dotted line of FIG. 4 becomes weaker than the input vibration indicated by the solid line. Assuming that the input vibration, the pre-clutch input vibration, and the output vibration are $\Delta N0$, $\Delta Nin$, and $\Delta Nout$, respectively, when an input rotation speed is $N0$, a rotation speed of the first inertial body 100 is $N0 \pm \Delta N0$; when a pre-clutch input rotation speed is $Nin$, a rotation speed of the second inertial body 102 is $Nin \pm \Delta Nin$; and when an output rotation speed is $Nout$, a rotation speed of the third inertial body 104 is $Nout \pm \Delta Nout$.

Figure 15:
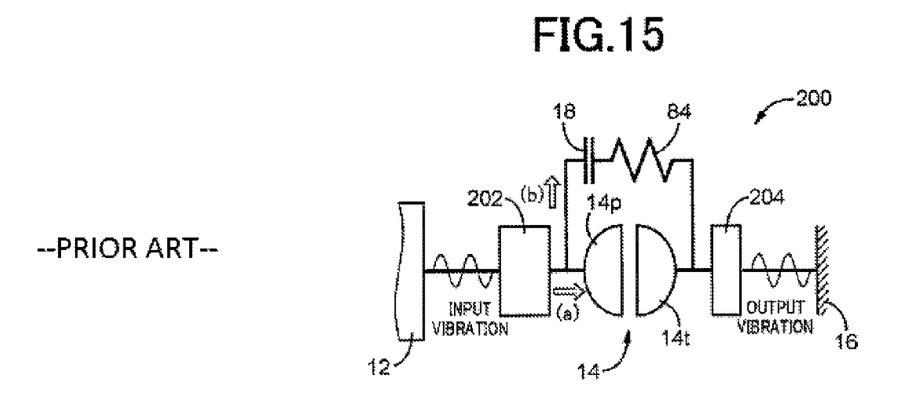
FIG. 15 is a schematic generally depicting a power transmission path in a conventional configuration disposed with the damper mechanism in series with the clutch for comparison with the present invention.
Figure 16:
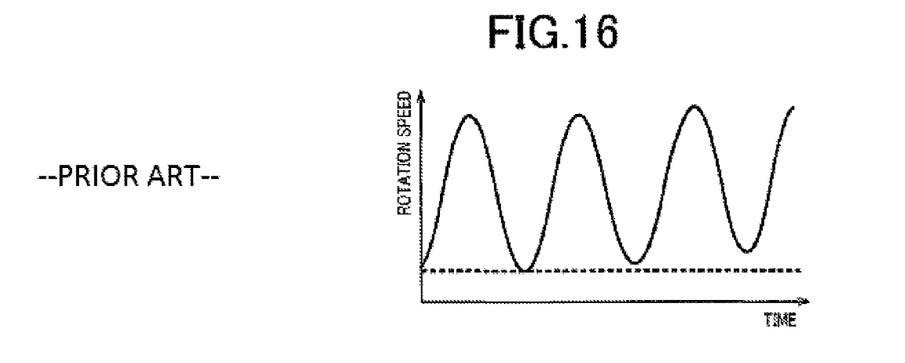
FIG. 16 is a diagram for explaining vibration related to the power transmission in the conventional configuration of FIG. 15.

For comparison with this embodiment, vibration related to power transmission in a conventional drive device will be considered. FIG. 15 is a schematic generally depicting a configuration disposed with a constituent element equivalent to the damper mechanism 84 in series with the clutch 18, i.e., a power transmission path in a conventional drive device 200 disposed with the damper mechanism 84 in parallel with the torque converter 14, and the constituent elements equivalent to this embodiment are denoted by the same reference numerals. FIG. 16 is a diagram for explaining vibration related to the power transmission in the drive device 200 and depicts input vibration (input rotation), i.e., vibration (rotation) input to an input side inertial body 202, as a solid line, and output rotation, i.e., rotation output from an output side inertial body 204, as a broken line.

In the configuration depicted in FIG. 15, input vibration generated by the engine 12 is input to the input side inertial body 202 and is transmitted from the input side inertial body 202 via (a) a first power transmission path mainly made up of the torque converter 14 or (b) a second power transmission path mainly made up of the clutch 18 to the output side inertial body 204. The first power transmission path and the second power transmission path are arranged in parallel. In this configuration, the damper mechanism 84 is disposed in the second power transmission path and, since input vibration to the damper mechanism 84 is mostly interrupted by the clutch 18, for example, during slip control of the clutch 18, the vibration is not input to the damper mechanism 84, resulting in a disadvantage that the vibration is not sufficiently absorbed. In the conventional configuration as depicted in FIG. 15, a rotation speed variation in an input side of the clutch 18 corresponds to an input rotation speed variation ΔN0 to the input side inertial body 202 (or a value slightly smaller than ΔN0) and, if the vibration is reduced by the friction material 78 of the clutch 18, a differential rotation speed Nslp of the clutch 18 must be made larger than the input rotation speed variation ΔN0. Therefore, the differential rotation speed Nslp of the clutch 18 is required to be a relatively larger value and, consequently, it becomes difficult to allow the damper mechanism 84 to sufficiently produce a vibration reduction effect as described above. Therefore, in the conventional configuration as depicted in FIG. 15, it is difficult to provide both the slip control by the clutch 18 and vibration suppression by the damper mechanism 84 at the same time.

Figure 6:
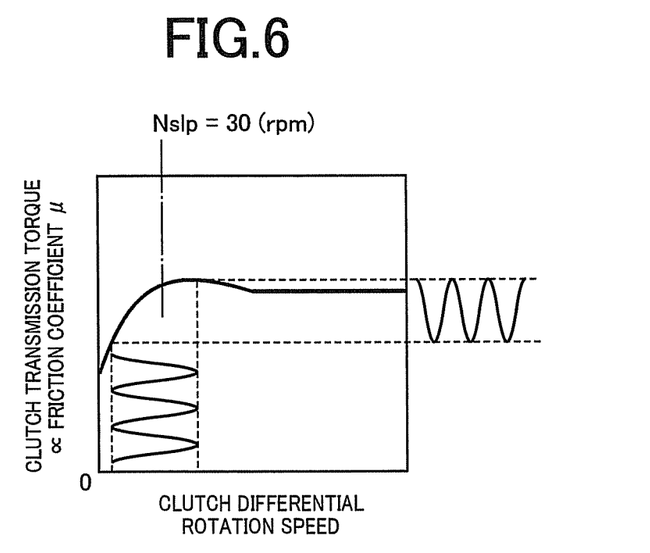
FIG. 6 is a diagram of example of a relationship between the differential rotation speed and a clutch transmission torque of the clutch included in the torque converter of FIG. 1.
Figure 7:
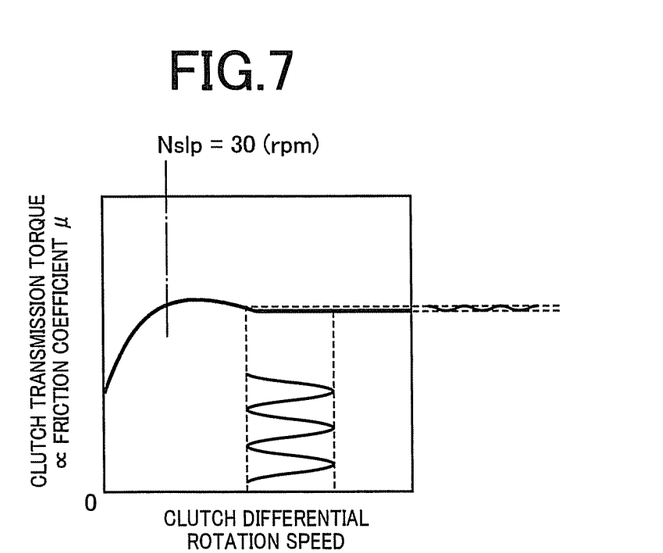
FIG. 7 is a diagram of example of a relationship between the differential rotation speed and a clutch transmission torque of the clutch included in the torque converter of FIG. 1.

FIGS. 6 and 7 are diagrams of examples of relationship between the differential rotation speed Nslp and a clutch transmission torque of the clutch 18 and also depicts rotation speed variation corresponding to an amplitude of vibration input to the clutch 18. The clutch transmission torque of the clutch 18 is generally proportional to a friction coefficient μ of the friction material 78 in the clutch 18, and the friction coefficient μ of the friction material 78 changes depending on a relative speed, i.e., the differential rotation speed Nslp of the clutch 18. For example, when vibration is relatively larger on an upstream side of the clutch 18, i.e., when engine torque variation is relatively larger, the rotation speed variation becomes larger if a frequency of torque variation is relatively smaller or if input side inertia is relatively larger. Particularly, when the differential rotation speed Nslp of the clutch 18 is relatively smaller, the rotation speed variation becomes larger. In other words, as depicted in FIG. 6, when the differential rotation speed Nslp of the clutch 18 is relatively smaller, a range of oscillation of the clutch transmission torque (friction coefficient μ) corresponding to the torque variation is larger, and the rotation speed variation transmitted to an output side consequently becomes larger. On the other hand, as depicted in FIG. 7, when the differential rotation speed Nslp of the clutch 18 is relatively larger, the range of oscillation of the clutch transmission torque (friction coefficient μ) corresponding to the torque variation is smaller, and the rotation speed variation transmitted to the output side consequently becomes smaller. Particularly, if the differential rotation speed Nslp of the clutch 18 is equal to or less than 1/2 rotations per second (30 [rpm]), the friction coefficient μ significantly changes in accordance with variation in the differential rotation speed Nslp of the clutch 18 and, therefore, a risk of occurrence of clutch vibration becomes larger.

Figure 5:
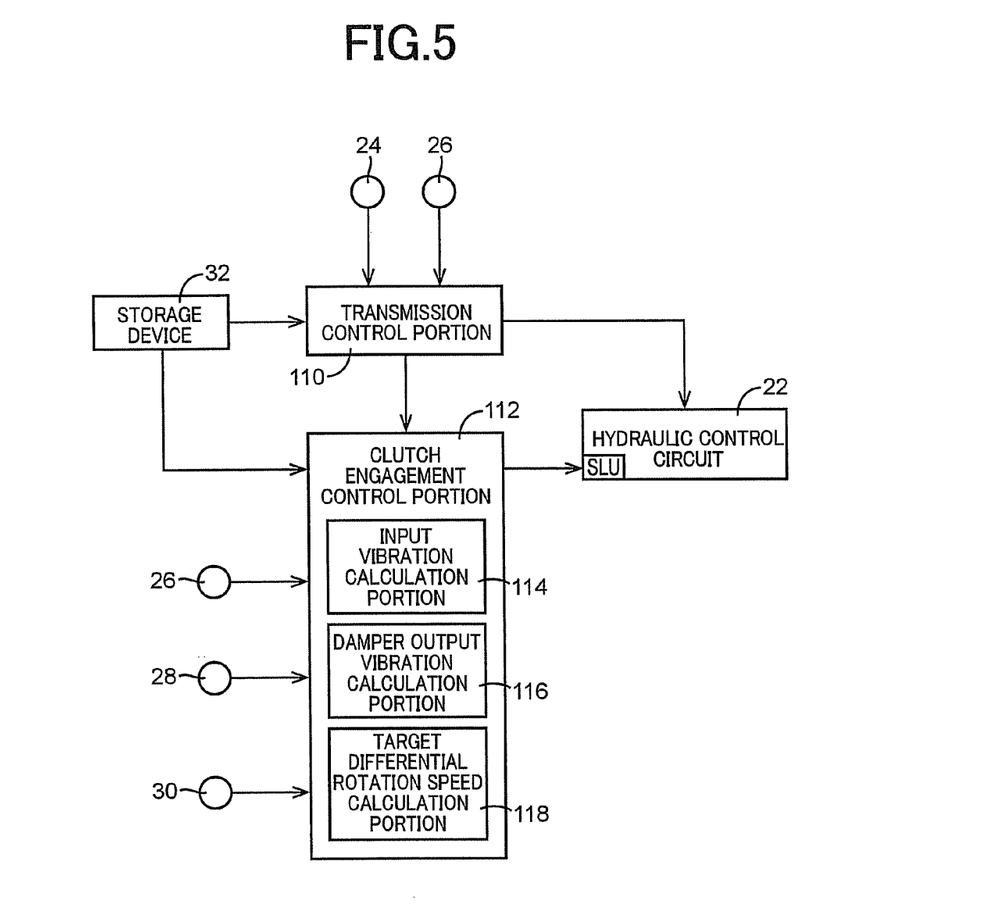
FIG. 5 is a functional block diagram for explaining a main portion of a control function included in the electronic control device of FIG. 1.

FIG. 5 is a functional block diagram for explaining a main portion of a control function included in the electronic control device 20. A transmission control portion 110 depicted in FIG. 5 provides the shift control of the automatic transmission 16 based on a running state (operational state) of a vehicle from a relationship stored in a storage device 32 in advance. For example, the transmission control portion 110 determines a shift stage (gear ratio γ) to be established at the current time point from an automatic transmission map preliminarily defined and stored in the storage device 32 based on a throttle valve opening degree $\theta_{TH}$ (accelerator operation amount $\theta_{ACC}$) indicative of an output request amount of a driver detected by the throttle sensor 26 and the vehicle speed V detected by the vehicle speed sensor 24 and controls an engagement state of engagement elements included in the automatic transmission 16 such that the shift stage is established. Therefore, the transmission control portion 110 outputs a control signal for controlling the drive of the hydraulic actuator included in the automatic transmission 16 via the hydraulic control circuit 22 so as to establish the shift stage in the automatic transmission 16.

A clutch engagement control portion 112 basically provides the engagement control of the clutch 18 based on a running state (operational state) of a vehicle from a relationship stored in the storage device 32 in advance. For example, as depicted in FIG. 8, the storage device 32 has a release region (tor-con region) of releasing the clutch 18, a slip control region (flex lockup region) of putting the clutch 18 into slip engagement (partial engagement), and an engagement region (lockup region) of completely engaging the clutch 18 defined based on, for example, the throttle valve opening degree $\theta_{TH}$ and the vehicle speed V and, preferably, the clutch engagement control portion 112 provides release control for releasing the clutch 18, slip control (flex lockup control) for putting the clutch 18 into slip engagement (partial engagement), or lockup control for completely engaging the clutch 18 from this relationship based on the throttle valve opening degree $\theta_{TH}$ (accelerator operation amount $\theta_{ACC}$) indicative of an output request amount of a driver detected by the throttle sensor 26, the vehicle speed V detected by the vehicle speed sensor 24, or a shift stage established in the automatic transmission 16 by the transmission control means 110.

Figure 8:
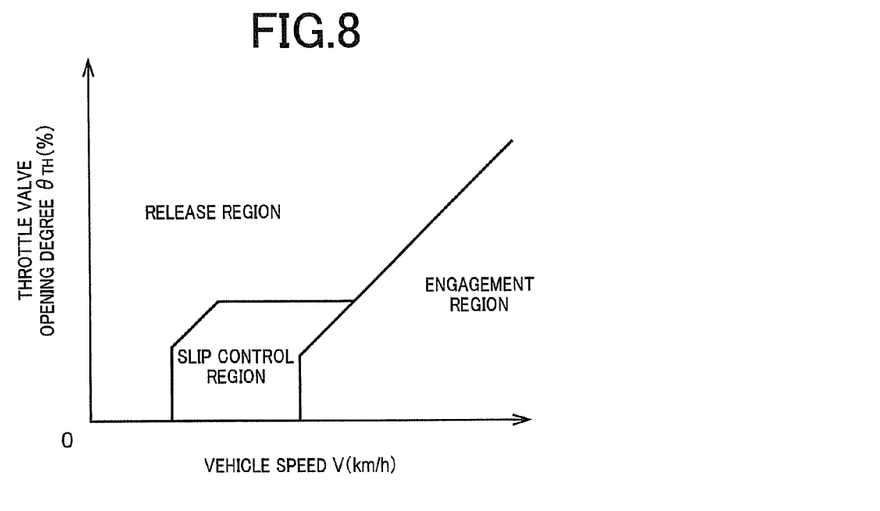
FIG. 8 depicts an example of a predefined relationship for controlling an engagement state of the clutch included in the torque converter of FIG. 1.

Therefore, if it is determined that the vehicle is in the release region based on the running state of the vehicle from the relationship depicted in FIG. 8 stored in the storage device 32, the clutch engagement control portion 112 controls the oil pressure supplied via the linear solenoid valve SLU included in the hydraulic control circuit 22 to an engagement oil chamber or a release oil chamber of the torque converter 14 to release the clutch 18 (achieve a non-engagement state). If it is determined that the vehicle is in the slip control region based on the running state of the vehicle from the relationship depicted in FIG. 8, the clutch engagement control portion 112 controls the oil pressure supplied via the linear solenoid valve SLU included in the hydraulic control circuit 22 to the engagement oil chamber or the release oil chamber of the torque converter 14 to put the clutch 18 into the slip engagement. If it is determined that the vehicle is in the engagement region based on the running state of the vehicle from the relationship depicted in FIG. 8, the clutch engagement control portion 112 controls the oil pressure supplied via the linear solenoid valve SLU included in the hydraulic control circuit 22 to the engagement oil chamber or the release oil chamber of the torque converter 14 to completely engage the clutch 18. Preferably, in transition control from the engagement region or the slip control region to the release region, the clutch engagement control portion 112 provides off-sweep control in which an output of the linear solenoid valve SLU is gradually reduced at a predetermined rate.

Figure 9:
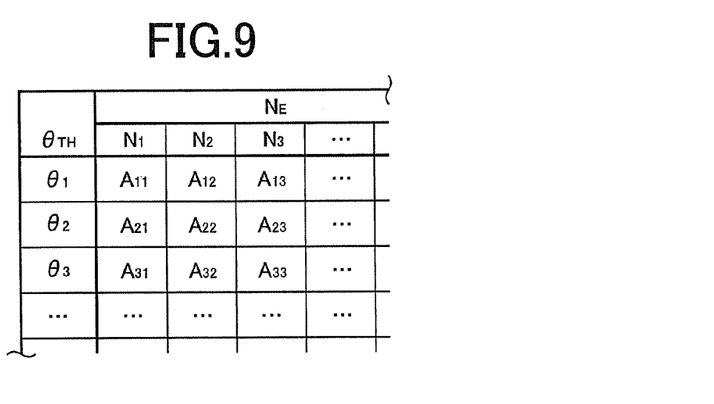
FIG. 9 depicts an example of a predefined relationship for calculating input vibration in the vehicle drive device of FIG. 1.

The clutch engagement control portion 112 includes an input vibration calculation portion 114, a damper output vibration calculation portion 116, and a target differential rotation speed calculation portion 118 in relation to the slip control of the clutch 18 during steady running (including gradual transient running), for example. The input vibration calculation portion 114 calculates the input vibration ΔN0 based on a state of the vehicle from a predefined relationship. The input vibration ΔN0 is vibration (torsional vibration) of the input side inertial body in the damper mechanism 84 and corresponds to variation (torsional vibration) of the torque input to the first inertial body 100 in the configuration depicted in FIG. 2 described above, for example. In other words, the input vibration ΔN0 corresponds to the vibration of the rotation output from the engine 12. For example, as exemplarily illustrated in FIG. 9, the storage device 32 stores input $_{vibrations}$ $A_{11}$, $A_{12}$, $A_{13}$, . . . preliminarily empirically obtained in accordance with an engine rotation speed $N_E$ and the throttle valve opening degree $\theta_{TH}$, for example, and the input vibration calculation portion 114 preferably calculates the input vibration $\Delta N0$ that is, for example, the variation of the torque input to the first inertial body 100, from the relationship stored in the storage device 32, based on the engine rotation speed $N_E$ calculated by the engine rotation speed sensor 28 and the throttle valve opening degree $\theta_{TH}$ (accelerator operation amount $\theta_{ACC}$) indicative of an output request amount of a driver detected by the throttle sensor 26. The input vibration calculation portion 114 may calculate the input vibration $\Delta N0$ from a predefined calculation equation etc., based on the engine rotation speed $N_E$, the throttle valve opening degree $\theta_{TH}$, etc.

Figure 10:
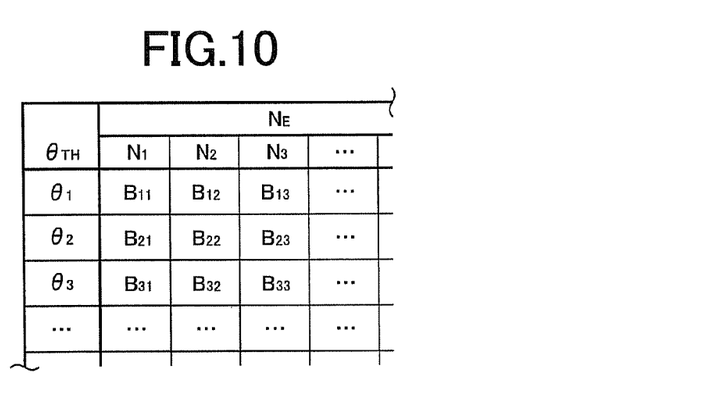
FIG. 10 depicts an example of a predefined relationship for calculating damper output vibration in the vehicle drive device of FIG. 1.

The damper output vibration calculation portion 116 calculates output vibration $\Delta Nin$ of the damper mechanism 84 based on a state of the vehicle from a predefined relationship. The damper output vibration $\Delta Nin$ is vibration (torsional vibration) of an output rotation of the damper mechanism 84, i.e., the input rotation Nin of the clutch 18 and corresponds to variation of the torque output from the second inertial body 102 in the configuration depicted in FIG. 2 described above, for example. For example, as exemplarily illustrated in FIG. 10, the storage device 32 stores damper output vibrations $B_{11}$, $B_{12}$, $B_{13}$, . . . preliminarily empirically obtained in accordance with the engine rotation speed $N_E$ and the throttle valve opening degree $\theta_{TH}$, for example, and the damper output vibration calculation portion 116 preferably calculates the output vibration $\Delta Nin$ that is, for example, the variation of the torque output from the second inertial body. 102, from the relationship stored in the storage device 32, based on the engine rotation speed $N_E$ calculated by the engine rotation speed sensor 28 and the throttle valve opening degree $\theta_{TH}$ (accelerator operation amount $\theta_{ACC}$) indicative of an output request amount of a driver detected by the throttle sensor 26. The damper output vibration calculation portion 116 may calculate the damper output vibration $\Delta Nin$ from a predefined calculation equation etc., based on the engine rotation speed $N_E$, the throttle valve opening degree $\theta_{TH}$, etc.

The target differential rotation speed calculation portion 118 calculates a target differential rotation speed in the clutch 18, i.e., a target value of the differential rotation speed Nslp between the pump impeller 14p acting as an input side member and the turbine impeller 14t acting as an output side member. Preferably, during the slip control of the clutch 18, the target differential rotation speed calculation portion 118 calculates the target value of the differential rotation speed Nslp based on the input vibration $\Delta N0$ calculated by the input vibration calculation portion 114, the damper output vibration $\Delta Nin$ calculated by the damper output vibration calculation portion 116, and a turbine rotation speed $N_T$ calculated by the turbine rotation speed sensor 30. In particular, the target differential rotation speed is defined such that a minimum value of the differential rotation speed Nslp of the torque converter 14 becomes equal to or greater than zero while a minimum value of the differential rotation speed becomes less than zero between the first inertial body 100 acting as an input side inertial body and the turbine impeller 14t (the third inertial body 104) acting as an output side member. The minimum value of the differential rotation speed Nslp of the torque converter 14 becomes equal to or greater than zero on the condition that the vehicle is accelerating. In other words, the differential rotation speed between the input side inertial body and the output side member corresponds to a differential rotation speed between a rotation speed $N_E \pm \Delta N0$ of the engine 12 with consideration given to vibration and the output rotation speed Nout, i.e., the rotation speed of the third inertial body 104 (the input rotation speed of the automatic transmission 16). In this embodiment, a positive direction of rotation related to the drive of the drive device 10 corresponds to a rotation direction of the engine 12.

Describing the calculation of the target value of the differential rotation speed Nslp by the target differential rotation speed calculation portion 118 with reference to FIG. 4, when the minimum value of the differential rotation speed Nslp of the torque converter 14 becomes equal to or greater than zero, this means that the differential rotation speed Nslp always has a positive value (does not have a negative value) and, in the example of FIG. 4, this means that the pre-clutch vibration indicated by the dashed-dotted line, i.e., the vibration input to the second inertial body 102, always has a value larger than the output vibration indicated by the broken line, i.e., the vibration output from the third inertial body 104 (a value corresponding to the dashed-dotted line does not fall below a value corresponding to the broken line). When the minimum value of the differential rotation speed between the input side inertial body and the output side member becomes less than zero, this means the presence of a period when the differential rotation speed falls below zero (the rotation speed of the output side member exceeds the rotation speed of the input side inertial body) and, in the example of FIG. 4, this means the presence of a period when the input vibration indicated by the solid line, i.e., the vibration input to the first inertial body 100, has a value smaller than the output vibration indicated by the broken line, i.e., the vibration output from the third inertial body 104. In other words, this means that a local minimal value of the input vibration (an inflection point from decrease to increase in the case of periodic vibrations) becomes less than the output vibration.

In other words, the target differential rotation speed calculation portion 118 calculates the target value of the differential rotation speed Nslp such that the differential rotation speed Nslp of the torque converter 14 becomes smaller than the input vibration $\Delta N0$ calculated by the input vibration calculation portion 114 and larger than the vibration $\Delta Nin$ input to the clutch 18. In particular, the target differential rotation speed calculation portion 118 calculates the target value of the differential rotation speed Nslp in the torque converter 14 such that the differential rotation speed Nslp in the torque converter 14 satisfies the following Equation (1). The respective rotation speeds N0, Nin, and Nout of the first inertial body 100, the second inertial body 102, and the third inertial body 104 have a relationship of medians represented by the following Equation (2) and a relationship of the minimum value of differential rotation speed represented by the following Equations (3) and (4). The relationship of the minimum value represented by Equations (3) and (4) is satisfied because $\Delta Nin$ is reduced more significantly than $\Delta N0$ (for example, by about 1/3 to 1/4) by the damper mechanism 84.

$$\Delta N0 > Nslp > \Delta Nin \quad (1)$$

$$N0 = Nin = Nout + Nslp \quad (2)$$

$$N0 - Nout - \Delta N0 << Nin - Nout - \Delta Nin \quad (3)$$

$$Nslp - \Delta N0 << Nslp - \Delta Nin \quad (4)$$

Preferably, the clutch engagement control portion 112 provides the slip control of the clutch 18 (target differential rotation speed setting control) based on the input vibration $\Delta N0$, the damper output vibration $\Delta Nin$, etc., described above when the differential rotation speed Nslp between the pump impeller 14*p* acting as the input side member and the turbine impeller 14*t* acting as the output side member of the torque converter 14 is equal to or less than 1/2 rotations per second (30 [rpm]). For example, the clutch engagement control portion 112 provides the slip control of the clutch 18 when the differential rotation speed Nslp is within a range equal to or greater than 1/6 rotations per second and equal to or less than 1/2 rotations per second. As described with reference to FIG. 6, if the differential rotation speed Nslp of the clutch 18 is equal to or less than 1/2 rotations per second, the friction coefficient μ tends to significantly change in accordance with variation in the differential rotation speed Nslp as compared to the other case (when the differential rotation speed Nslp is relatively larger) as depicted in FIG. 7. Therefore, by providing the control of this embodiment described above when the differential rotation speed Nslp of the clutch 18 is equal to or less than 1/2 rotations per second, the slip control by the clutch 18 and the vibration suppression by the damper mechanism 84 can be achieved at the same time even in a region having a steep gradient of a relationship between the clutch differential rotation speed Nslp and the friction coefficient μ of the friction material 78 and causing the friction coefficient μ to significantly change in accordance with variation in the differential rotation speed Nslp.

When the damper mechanism 84 acting as a torsional vibration reduction device has torsional rigidity (modulus of rigidity) of K [N·m/rad] and the total inertial mass in a power transmission path from the engine 12 to the clutch 18 is Iall [kg·m$^2$], the drive device 10 of this embodiment preferably satisfies K/Iall<5000. The drive device 10 more preferably satisfies K/Iall<4000 and most preferably satisfies K/Iall<2500. The total inertial mass Iall is a total of inertial mass when the constituent elements in the power transmission path from the engine 12 to the clutch 18 are considered as inertial mass and, in the configuration depicted in FIG. 2, the sum of inertial mass $I_{100}$ of the first inertial body 100 and inertial mass $I_{102}$ of the second inertial body 102 is the total inertial mass Iall (=$I_{100}$+$I_{102}$).

Figure 11:
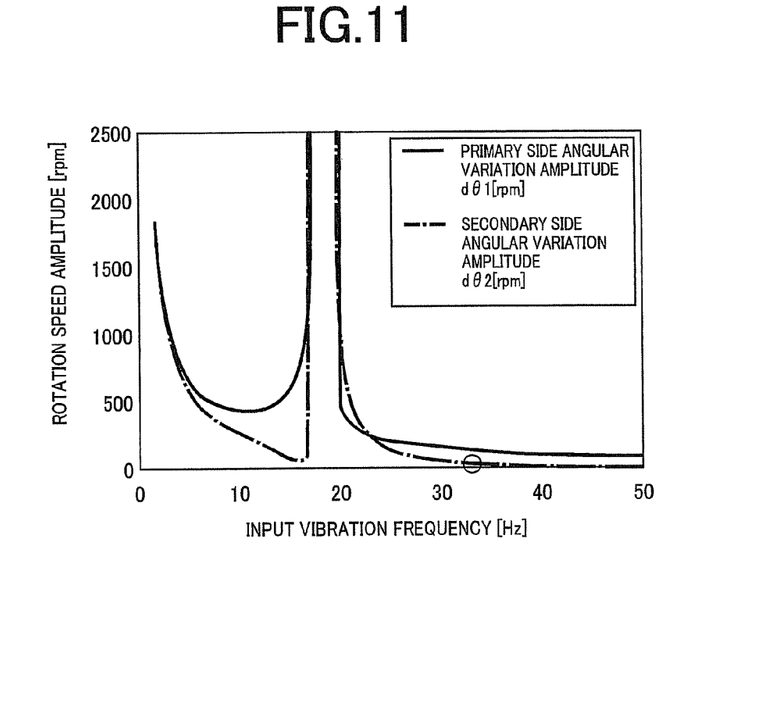
FIG. 11 is a graph for explaining vibration when the torsional rigidity of the damper mechanism and the inertial masses in a power transmission path are determined in the vehicle drive device of FIG. 1.
Figure 12:
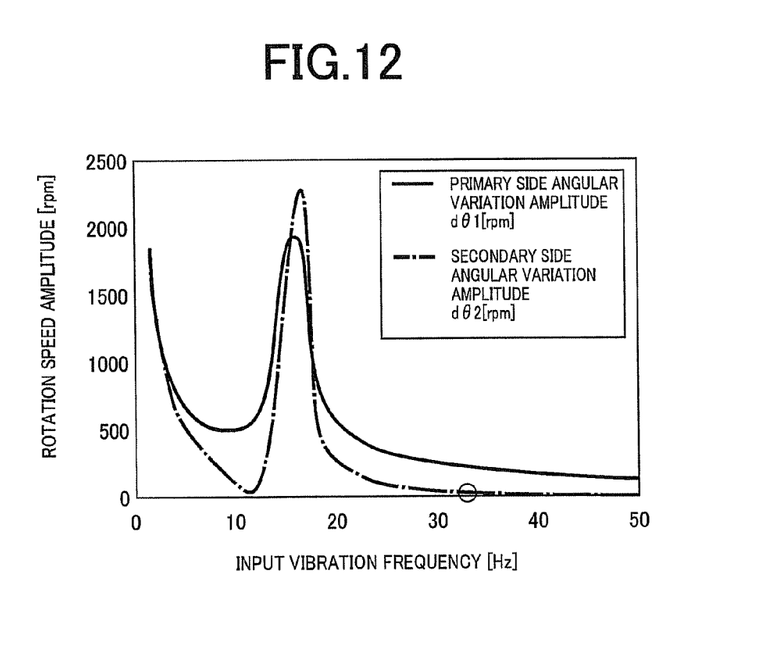
FIG. 12 is a graph for explaining vibration when the torsional rigidity of the damper mechanism and the inertial masses in a power transmission path are determined in the vehicle drive device of FIG. 1.
Figure 13:
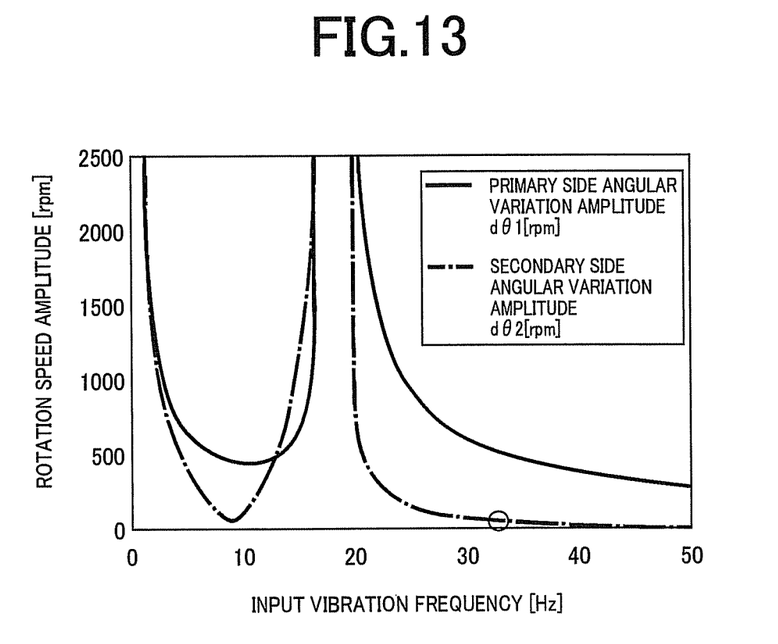
FIG. 13 is a graph for explaining vibration when the torsional rigidity of the damper mechanism and the inertial masses in a power transmission path are determined in the vehicle drive device of FIG. 1.
Figure 17:
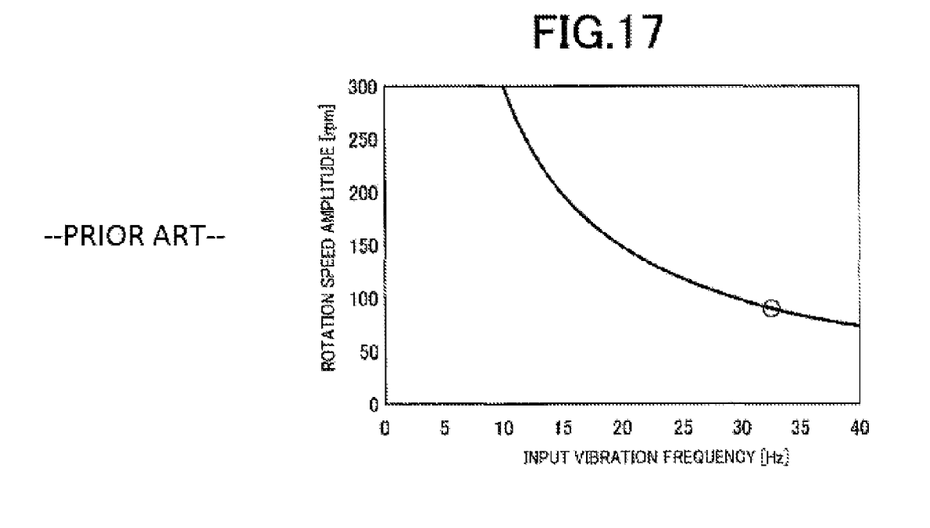
FIG. 17 is a graph for explaining vibration when the inertial masses in a power transmission path of a drive device without the damper mechanism are determined for comparison with the present invention.

FIGS. 11 to 13 are graphs for explaining vibrations when the inertial masses of the first inertial body 100 and the second inertial body 102 are changed in a configuration including, for example, the four-cycle four-cylinder engine 12 with the torsional rigidity of the damper mechanism 84 of 500 [N·m/rad], and depict primary side angular variation amplitude, i.e., the vibration of the first inertial body 100, as a solid line and secondary side angular variation amplitude, i.e., the vibration of the second inertial body 102, as a dashed-dotted line. FIG. 11 depicts the case when the inertial mass of the first inertial body 100 is 0.15 [kg·m$^2$] and the inertial mass of the second inertial body 102 is 0.05 [kg·m$^2$]; FIG. 12 depicts the case when the inertial masses of both the first inertial body 100 and the second inertial body 102 are 0.10 [kg·m$^2$]; and FIG. 13 depicts the case when the inertial mass of the first inertial body 100 is 0.05 [kg·m$^2$] and the inertial mass of the second inertial body 102 is 0.15 [kg·m$^2$]. Therefore, the graphs of FIGS. 11 to 13 all correspond to the case that the total inertial mass in the power transmission path from the engine 12 to the clutch 18 is Iall=0.20 [kg·m$^2$]. FIG. 17 is a graph for explaining vibrations when the total inertial mass in the power transmission path from the engine 12 to the clutch 18 is Iall=0.20 [kg·m$^2$] in a configuration including, for example, the four-cycle four-cylinder engine 12 without the damper mechanism 84 in a power transmission path between the first inertial body 100 and the second inertial body 102, for comparison with this embodiment.

As depicted in FIG. 17, in the configuration without the damper mechanism 84 in the power transmission path between the first inertial body 100 and the second inertial body 102, an amplitude of the vibrating rotation speed (herein referred as a rotation speed amplitude) corresponding to the engine rotation speed $N_E$=1000 [rpm] indicated by a circle mark is about 91 [rpm]. On the other hand, in the configuration of this embodiment including the damper mechanism 84 in the power transmission path between the first inertial body 100 and the second inertial body 102, the rotation speed amplitude corresponding to the engine rotation speed $N_E$=1000 [rpm] indicated by a circle mark is about 39.8 [rpm] in the graph depicted in FIG. 11; the rotation speed amplitude corresponding to the engine rotation speed $N_E$=1000 [rpm] indicated by a circle mark is about 26.9 [rpm] in the graph depicted in FIG. 12; the rotation speed amplitude corresponding to the engine rotation speed $N_E$=1000 [rpm] indicated by a circle mark is about 39.8 [rpm] in the graph depicted in FIG. 13; and therefore it can be seen that the rotation speed amplitude (vibration) is reduced by about 1/4 to 1/2 as compared to the conventional configuration corresponding to the graph of FIG. 17. In other words, when the damper mechanism 84 has torsional rigidity of K [N·m/rad] and the total inertial mass in the power transmission path from the engine 12 to the clutch 18 is Iall [kg·m$^2$], it can be seen that the effect of further reducing vibration than the conventional configuration is acquired by satisfying K/Iall<5000.

Figure 14:
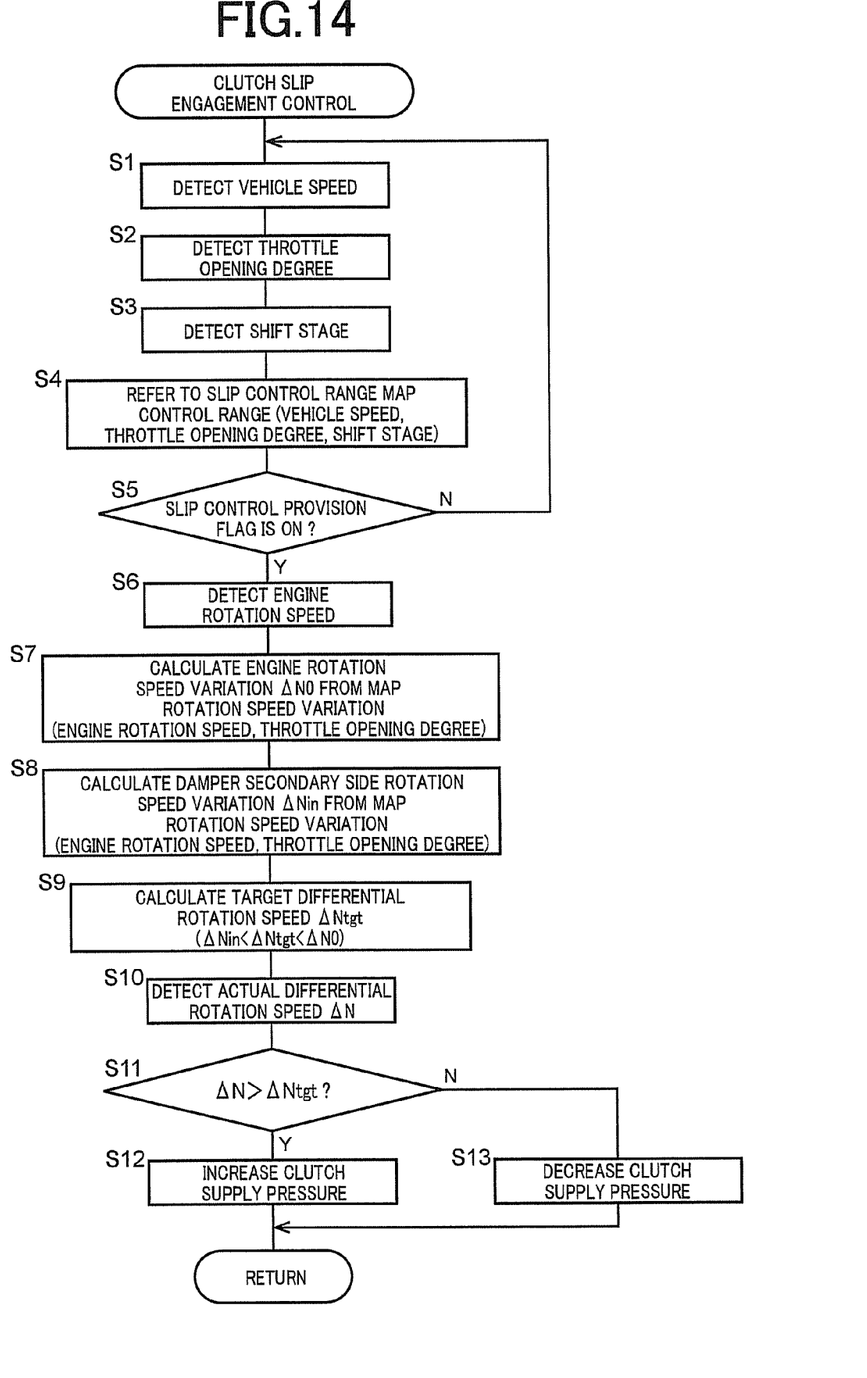
FIG. 14 is a flowchart for explaining a main portion of the slip engagement control of the clutch by the electronic control device of FIG. 1.

FIG. 14 is a flowchart for explaining a main portion of the slip engagement control of the clutch 18 by the electronic control device 20 and is repeatedly executed in a predetermined cycle.

First, at step (hereinafter, step will be omitted) S1, the vehicle speed V is detected by the vehicle speed sensor 24. At S2, the throttle opening degree $\theta_{TH}$ is detected by the throttle sensor 26. At S3, the shift stage established in the automatic transmission 16 is detected. At S4, for example, it is determined whether a vehicle is in the slip control region of putting the clutch 18 into the slip engagement, for example, from a slip control range map as depicted in FIG. 8, based on the vehicle speed V detected at S1, the throttle opening degree $\theta_{TH}$ detected at S2, the shift stage in the automatic transmission 16 detected at S3, etc. At S5, it is determined whether a slip control provision flag is set to ON as a result of the determination on the slip control region at S4. If the determination of S5 is negative, the process from S1 is executed again and, if the determination of S5 is affirmative, the process from S6 is executed.

At S6, the rotation speed $N_E$ of the engine 12 is detected by the engine rotation speed sensor 28. At S7, the input vibration ΔN0 is calculated that is an engine rotation speed variation, i.e., variation of the torque input to the first inertial body 100, from the map stored in the storage device 32 based on the throttle opening degree $\theta_{TH}$ detected at S2 and the engine rotation speed $N_E$ detected at S6. At S8, the clutch input vibration ΔNin is calculated that is the damper secondary side rotation speed variation, i.e., variation of the torque input to the second inertial body 102, from the map stored in the storage device 32 based on the throttle opening degree $\theta_{TH}$ detected at S2 and the engine rotation speed $N_E$ detected at S6. At S9, a target differential rotation speed ΔNtgt of the clutch 18 is calculated that is smaller than the input vibration ΔN0 calculated at S7 and larger than the clutch input vibration ΔNin calculated at S8.

At S10, an actual differential rotation speed ΔN in the clutch 18 is detected based on, for example, the engine rotation speed $N_E$ detected at S6 and the turbine rotation speed $N_T$ detected by the turbine rotation speed sensor 30. At S11, it is determined whether the actual differential rotation speed ΔN in the clutch 18 detected at S10 is larger than the target differential rotation speed ΔNtgt calculated at S9. If the determination of S11 is affirmative, an engagement pressure (supply pressure) of the clutch 18 is increased via the linear solenoid valve SLU included in the hydraulic control circuit 22 at S12 before this routine is terminated and, if the determination of S11 is negative, the engagement pressure (supply pressure) of the clutch 18 is decreased via the linear solenoid valve SLU included in the hydraulic control circuit 22 at S13 before this routine is terminated. In the above control, S7, S8, and S9 correspond to the processes of the input vibration calculation portion 114, the damper output vibration calculation portion 116, and the target differential rotation speed calculation portion 118, respectively, and S4, S5, and S7 to S13 correspond to the process of the clutch engagement control portion 112.

As described above, according to this embodiment, during the slip control when the clutch 18 is put into the slip engagement, the minimum value of the differential rotation speed Nslp is set equal to or greater than zero between the pump impeller 14p acting as the input side member and the turbine impeller 14t acting as the output side member while the minimum value of the differential rotation speed is set less than zero between the first inertial body 100 acting as the input side inertial body in the damper mechanism 84 acting as the torsional vibration reduction device and the turbine impeller 14t (the third inertial body 104) and, therefore, the torsional vibration input to the clutch 18 can be reduced by the damper mechanism 84 while a durability of the friction material 78 in the clutch 18 is improved, and the slip control by the clutch 18 and the vibration suppression by the damper mechanism 84 can be achieved at the same time. In other words, the drive device 10 can be provided that realizes preferred fuel efficiency while allowing the damper mechanism 84 to produce the vibration suppressing effect, during the slip control of the clutch 18 included in the torque converter 14 acting as the fluid power transmission device.

Particularly, by setting the minimum value of the differential rotation speed Nslp between the pump impeller 14p and the turbine impeller 14t equal to or greater than zero, a surface of the friction material 78 can be used in constant directionality in a configuration with a wet friction material 78 included in the clutch 18, and the durability of the friction material 78 can be improved. In particular, a friction material such as a wet clutch generally has a gradient of the friction coefficient μ extremely increased and generating vibration when the friction coefficient μ comes closer to zero and, additionally, the durability of the friction material may be reduced by inversing the directionality of the friction material surface; however, these defects can preferably be restrained from occurring by setting the minimum value of the differential rotation speed Nslp equal to or greater than zero. By setting the minimum value of the differential rotation speed between the first inertial body 100 and the turbine impeller 14t (third inertial body 104) less than zero, the input vibration in a regularly used range of the clutch 18 can be reduced. Therefore, the vibration generated by the clutch 18 can be made smaller and the vibration reduction effect can be achieved in the drive device 10 as a whole.

Since the target value of the differential rotation speed Nslp is set to a value smaller than the vibration ΔN0 of the input side inertial body in the damper mechanism 84 and larger than the vibration ΔNin input to the clutch 18, the torsional vibration input to the clutch 18 can be reduced by the damper mechanism 84 while the durability of the friction material 78 is improved in the clutch 18, and the slip control by the clutch 18 and the vibration suppression by the damper mechanism 84 can be achieved at the same time in a practical form.

Since the differential rotation Nslp between the pump impeller 14p and the turbine impeller 14t is set equal to or less than 1/2 rotations per second (30 [rpm]), particularly when the friction coefficient μ of the friction material 78 of the clutch 18 easily changes depending on the differential rotation of the clutch 18, preferred fuel efficiency can be realized while the vibration suppressing effect is produced by the damper mechanism 84. In other words, since an average slide loss of the clutch 18 can be reduced, a transmission efficiency can further be increased and the fuel efficiency can further be improved.

Since a value K/Iall acquired by dividing the torsional rigidity K of the damper mechanism 84 by the total inertial mass Iall in the power transmission path from the engine 12 to the clutch 18 is set less than 5000, the vibration can preferably be reduced as compared to the conventional configuration without the damper mechanism 84 in the power transmission path between the engine 12 and the torque converter 14.

Although the preferred embodiment of the present invention has been described in detail with reference to the drawings, the present invention is not limited thereto and is implemented with various modifications applied within a range not departing from the spirit thereof.

Nomenclature Of Elements

10: vehicle drive device 12: engine 14: torque converter (fluid power transmission device) 14p: pump impeller (input side member) 14s: stator impeller 14t: turbine impeller (output side member) 16: automatic transmission 18: lockup clutch 20: electronic control device 22: hydraulic control circuit 24: vehicle speed sensor 26: throttle sensor 28: engine rotation speed sensor 30: turbine rotation speed sensor 32: storage device 34: unidirectional clutch 36: crankshaft 38: input shaft 40: housing 42: front cover 44: rear cover 46: drive plate 48: pump cover 50: blades 52: sliding ring 54: hub portion 56: cylindrical shaft portion 58: blades 60: blade 62: circular plate portion 64: cylindrical portion 66: cylindrical fixation shaft 68: partition wall 70: hydraulic pump 70a: pump body 70b: pump cover 70c: inner ring gear 70d: outer ring gear 72: cylindrical shaft 74: engagement projection 76: piston 78: friction material 80: circular plate-shaped portion 82: ring gear 84: damper mechanism (torsional vibration reduction device) 86: large-diameter damper spring 88: small-diameter damper spring 90: cutouts 92: damper hub 94: bearing 96: damper cover 100: first inertial body (input side inertial body) 102: second inertial body 104: third inertial body 110: transmission control portion 112: clutch engagement control portion 114: input vibration calculation portion 116: damper output vibration calculation portion 118: target differential rotation speed calculation portion 200: drive device (conventional technique) 202: input side inertial body 204: output side inertial body SLU: linear solenoid valve

The invention claimed is:

1. A vehicle drive device comprising:
an engine;
a fluid power transmission device;
a clutch disposed between an input side member and an output side member in the fluid power transmission device;
a torsional vibration reduction device disposed in a power transmission path between the engine and the fluid power transmission device in series with the fluid power transmission device, and a control device configured to control the clutch,
wherein the control device is configured, when the clutch is put into slip engagement,
to control an engagement pressure of the clutch such that a minimum value is set equal to or greater than zero for a differential rotation speed acquired by subtracting a rotation speed of the output side member from a rotation speed of the input side member and such that a minimum value is set less than zero for a differential rotation speed acquired by subtracting the rotation speed of the output side member from a rotation speed of an input side inertial body in the torsional vibration reduction device.

2. The vehicle drive device of claim 1, wherein the control device is configured to control the engagement pressure of the clutch in accordance with a target value of the differential rotation speed acquired by subtracting the rotation speed of the output side member from the rotation speed of the input side member is set to a value smaller than fluctuation of the rotation speed of the input side inertial body in the torsional vibration reduction device and larger than fluctuation of a rotation speed input to the clutch.

3. The vehicle drive device of claim 1, wherein differential rotation between the input side member and the output side member is set equal to or less than 1/2 rotations per second.

4. The vehicle drive device of claim 1, wherein a value acquired by dividing torsional rigidity of the torsional vibration reduction device by total inertial mass in a power transmission path from the engine to the clutch is set less than 5000 [rad/sec$^2$].

5. The vehicle drive device of claim 1, wherein the input side member and the output side member are inhibited from being rotated relative to each other during a complete engagement of the clutch.

* * * * *